July 28, 1953  N. LAZAR  2,646,631
COMBINED ABACUS AND COUNTING RACK
Filed Jan. 22, 1947  2 Sheets-Sheet 1

INVENTOR.
NATHAN LAZAR
BY
ATTORNEYS

July 28, 1953  N. LAZAR  2,646,631
COMBINED ABACUS AND COUNTING RACK
Filed Jan. 22, 1947  2 Sheets-Sheet 2

INVENTOR.
NATHAN LAZAR
BY
ATTORNEYS

Patented July 28, 1953

2,646,631

UNITED STATES PATENT OFFICE 2,646,631

COMBINED ABACUS AND COUNTING RACK

Nathan Lazar, New York, N. Y.

Application January 22, 1947, Serial No. 723,553

3 Claims. (Cl. 35—33)

The present invention relates to abaci, and more particularly to a combined abacus and counting rack suited especially not only for facilitating the teaching of the various arithmetical processes, but also of conveying clearly the structure of the number system.

It is the general object of the present invention to provide a combined abacus and counting rack by the aid of which the conception of place value in our number system can be more readily inculcated in the mind of the child and the child given a more meaningful idea with regard to the Hindu-Arabic symbols used in arithmetic.

It is a further object of the invention to provide a simple and attractive structure with the aid of which the child can be taught first the meaning of the units in consecutive counting and thereafter, as he progresses, be taught the simplification effected by assigning place value and then transcribing such place values into numerical notation.

It is a still further object of the invention to provide an abacus structure by which the historical development of the abacus in different countries and at different times can be taught to the more advanced pupil while at the same time the development of different types of abaci along different principles can be demonstrated, the structure thereby becoming what may be deemed a "matrix" abacus; in consequence of which a better conception of the arbitrary character of the numeral notation is conveyed to the advanced pupil and the flexibility of mathematics in general and the possibility of different scales of mathematical notation is made clearer to him; all this operating to free the mind of the child from the idea of rigidity or fixity in mathematical notation.

A still further object of the invention is to provide an apparatus by the aid of which the signification of the zero, with which concept children have much difficulty, is made clearer both visually and palpably.

It is also an object of the invention to provide a combined abacus and counting rack of which particularly the abacus section can be in part covered or screened off for various purposes as will be described more fully hereinbelow.

Figure 1:
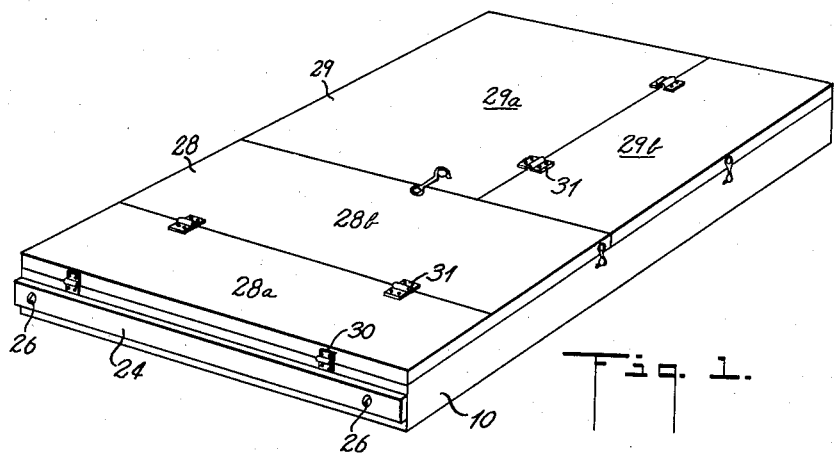
Figure 2:
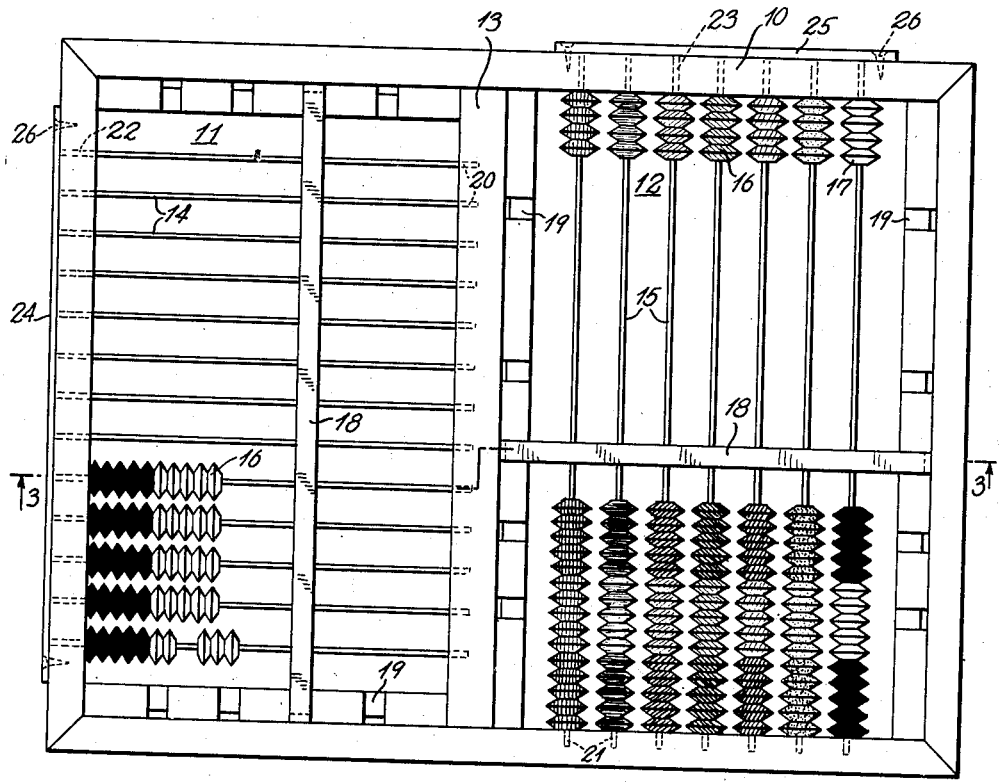
Figure 3:
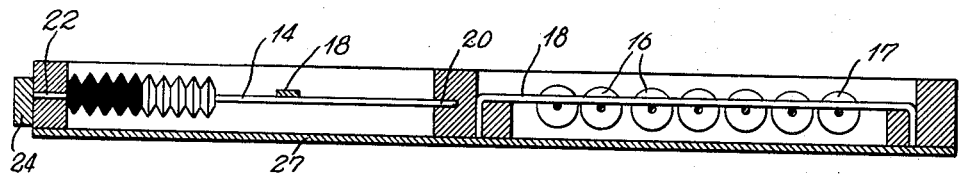
Figure 4:
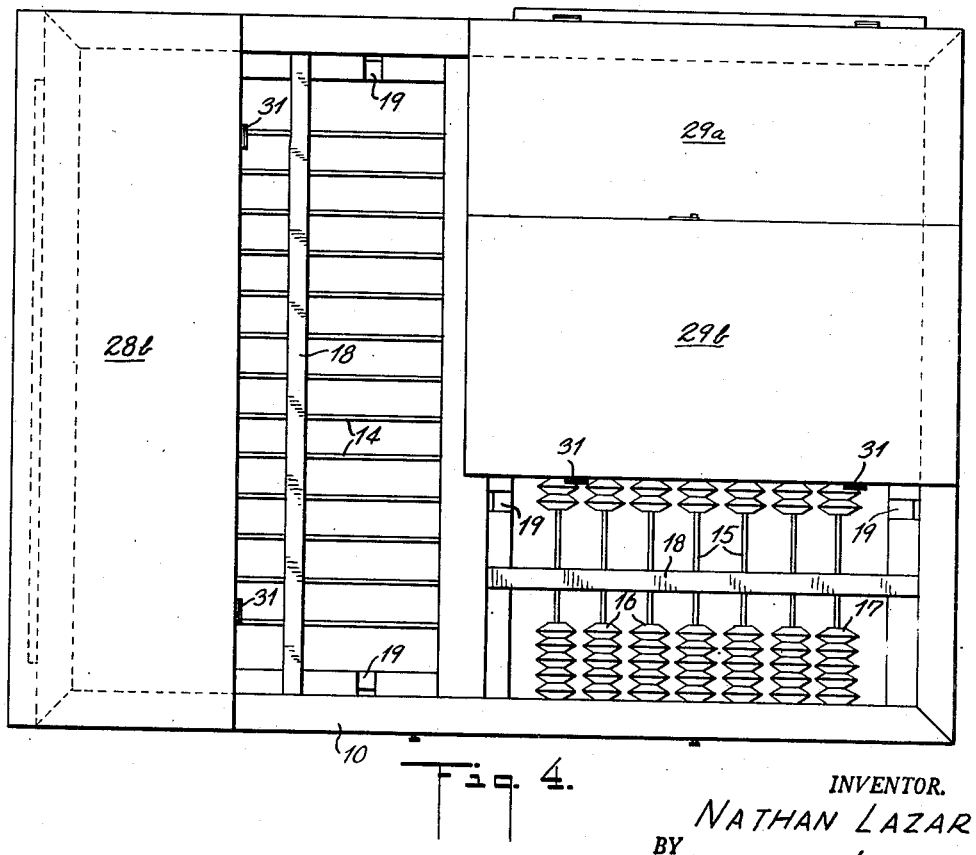

Other objects and advantages of the invention will become apparent from the following more detailed specifications taken in connection with the accompanying drawings, wherein Fig. 1 is a perspective view of my combined abacus and counting frame; Fig. 2 is a plan view thereof with the covers removed; Fig. 3 is a vertical section along the line III—III of Fig. 2; and Fig. 4 shows the apparatus employed for illustrating different types of abaci.

As shown in the drawing, the apparatus comprises a frame 10 made of wood or other suitable material which is divided into two main sections 11 and 12 by a partition 13. The section 11 is provided with a plurality of rods or bars 14, which may be ten to fifteen in number, while the section 12 is provided with a plurality of rods or bars 15 which may be six, seven or more in number and extend normally to the rods 14. In use, the sections 11 and 12 are preferably arranged side by side, as shown with the section 11 at the left. The section 11 then has its rods 14 extending horizontally and constitutes a counting frame or rack; while the section 12 with its vertical rods 15 is intended to be operated as an abacus.

The rods 14 and 15 are provided with beads, markers or counters 16 which may be of the usual form employed in abaci. The rods 14 of the counting rack are preferably each provided with ten counters divided into two groups of five each which, as shown, are differently colored, as black and white, to facilitate the counting of the beads and to inculcate in the mind of the child the importance of the number 5. The unit row of counters of the abacus (the extreme right-hand row if no decimal places are to be employed) is provided with beads of the same color as in the counting rack, so as to indicate to the pupil that the counters in this row have the same unit value as any of the beads in the counting rack.

For reasons which will be explained hereinafter, I prefer to provide each of the rods 15 with nineteen counters. In order better to convey to the child the idea of different values for the counters in the different rows or places of the abacus section, I employ differently colored counters on the different abacus rods. To facilitate computation, I prefer to divide the counters in each row into three groups of five each and a terminal group of four, the different groups (except for the unit row, where the coloring of the counting rack counters is followed) being differentiated by being colored in different tones or shades of the same color, or in any other suitable way, as by being made of different sizes or shapes.

In the counting rack section each of the counters on all of the rods has the same value, namely, 1, and the pupil is taught the reading and recording of numbers and also simple addition, subtraction, multiplication and division with the aid of the counters on the rods 14.

In the counting rack, no significance is attached to the position of the beads on the different rods. The counting rack is employed in known manner for different arithmetical operations; and by coloring the beads differently in groups of five, the reading of the final results is greatly facilitated for the child.

In the use of the apparatus, the child is first shown how numbers are represented on the counting rack and then on the abacus, and the idea is brought home to him of the simplification effected by the place values. Thus, by way of illustration, he is shown how a number, say "111" is represented only laboriously on the counting rack, but is very quickly and easily represented and read off the abacus by reason of the arbitrary value attached to the different places on the abacus. As the arrangement of the vertical rods in the abacus corresponds to the position of the digits of the numerals in our number system, the child more quickly associates the units, tens, hundreds and higher places in a number with the rod positions on the abacus and the meaning of a multi-place number in our Hindu-Arabic notation becomes clearer to him in a shorter time than heretofore. As the pupil's idea of the structure of the number system progresses, he is then taught operations of addition, subtraction, multiplication and division on both the counting rack and the abacus, and he is made to realize how great a simplification is effected by the arbitrary assignment of local values at the different places. The ideas of "carrying" in addition, "borrowing" in subtraction, of adding a zero on multiplying by ten, and of the "remainder" and "quotient" in division and other notations associated with the arithmetical operations, all have their visual and palpable counterparts when the two frames are used to illustrate them.

As indicated above, the abacus is provided with 19 counters on each of its rods. So far as I am aware, this specific number of counters has never been employed either in an abacus or in counting racks. This number of counters on each rod makes it possible for the child to perform all elementary arithmetical computations without having to "carry" any number in his mind and without the aid of any memorized addition, subtraction, multiplication or division tables. With the aid of these 19 counters on each rod, all that the child has to know is the process of consecutive counting and the fact that any counter on any rod in the abacus is equal in value to ten counters of the next rod on the right.

To illustrate the value of the presence of 19 counters on each rod, let us assume that the child has the problem of adding 99 and 99. He will push down, first, two groups of counters of nine each on the units and tens columns. Then he will push down a second group of nine counters on each of the first two columns. Then to represent the number in the proper notation he will push back ten counters of the units row and push down an additional single counter on the tens row, thereby exhausting all the 19 counters in the tens row. Then he will push back 10 counters on the tens row and push down 1 counter on the hundreds row. It will be evident that where, for example, 999 is to be added to 999, all of the 19 counters of the hundreds row will be utilized, etc. It will also be evident that the nineteenth counter in the units row is not necessary for these calculations, but I prefer to provide this extra counter in the units row in the event that the abacus is enlarged to provide also one or more rows to indicate decimal positions to the right of the units row. However, where such decimal positions are not employed, the units row may have only 18 counters but the higher rows will have 19.

In many computations that the child will perform on the abacus, he will discover that no shifted counter, that is, no computable value, will be present in one or more of the rods or columns. When he comes to represent the result on the abacus with the Hindu-Arabic notation, he will realize that some symbol must be employed to represent the place on the abacus which has no shifted counter thereon. The idea will then be developed in him that there is a need for some symbol to represent the absence of a shifted counter at a particular place and that some mark or symbol must be used even though it represents "nothing" in order to give the true value to the digits at the other places. He is thus given the conception that the zero is in the nature of a spacer or filler block to keep the other digits in their proper places and to avoid confusion. This combination of visual representation of counters on the abacus with the numerical notation will be of aid to many children who would otherwise have difficulty in realizing that the different numerals of the Hindu-Arabic system are purely arbitrary in nature and have no intrinsic meaning of themselves, and the child's memory and understanding will be aided by his visualization of a number in terms of the position and number of counters in an abacus frame. Thus the operations of addition, subtraction, multiplication and division take on more meaning because the child will be really putting counters together, taking them away, etc., and he will realize more easily that he is dealing fundamentally with units or groups of units and will not be performing purely mechanical memory operations.

Fig. 3 illustrates one way in which the combined counting frame and abacus can be utilized to represent different forms of abaci. In fact, the counting rack can also be used to show the historical development of the abacus from the ancient Persian form, which had ten beads on each rod arranged horizontally, as in the counting rack shown on the drawing herein, to the Chinese abacus having seven counters on each rod divided into a group of five and a group of two, on opposite sides of a transverse bar, then to the early Japanese having six counters divided into a group of five, and a second group of one, and finally the modern Japanese form having five counters on each rod divided into a group of four and a group of 1. The counting rack can also be employed to illustrate the Russian type of abacus having on the lowest rod four counters (representing each one-quarter kopek), on the next two rods 10 counters each, on the fourth rod 4 counters (each representing one-quarter ruble), and on all the higher rods 10 counters each. The two middle counters of each row in a Russian abacus are colored differently from the counters on each side thereof, and in order to represent the Russian abacus more faithfully the rods of the counting rack are made removable in order that the counters may be arranged as required.

In representing the different types of abaci, both the primitive forms and those now in use, there is employed a transverse bar 18 which is of U-form, as shown in Figs. 2 and 3, the legs being fitted into slits or apertures 19 at the sides of the abacus and preferably also of the counting rack frames. The transverse bar is preferably relatively narrow in form, and there may be employed with it a wide transverse bar serving as a frame piece to mark off the area to be employed as an abacus from the remainder of the section 11 or 12 or from another abacus represented on the same section. In this way the apparatus of the invention can be easily converted into one or more or all of the different forms of abaci both to represent historical development of the abacus and to illustrate the operation of the different abaci.

To facilitate both the assembly of the rods in both the counting rack and abacus sections of my apparatus and their removal for replacement or rearrangement of counters, I prefer to provide one side of each of the frames marking off the counting rack and abacus areas, with a series of holes 20 or 21 which pass only partially through the respective frame member; while the opposite frame member is provided with registering apertures 22 or 23 passing completely through such frame member. The rods 14 or 15 are then assembled in the apparatus by merely passing them through the appropriate openings 22 or 23. The rods are held against accidental displacement by means of a removable bar 24 or 25 secured to the outside face of the frame sides containing apertures 22 and 23 in any suitable way, as by means of screws 26.

The apparatus is preferably provided with a floor panel 27 and also with a cover. The latter is preferably divided into two sections 28 and 29 overlying the counting rack and abacus sections, respectively. Each of the cover sections 28 and 29 is hinged to the frame 10 as shown, for example, at 30. I prefer also to make each cover section of two parts, as shown at 28a and 28b and at 29a and 29b, the two parts of each section being hinged together as shown, for example, at 31. With this construction, only part of the counting rack and abacus areas can be uncovered, where only part of the counters on the rods are utilized for illustrating a particular type of abacus, as in teaching the historical development of the abacus. The cover 28 or 29 can thus be used as a frame section to mark off a limited part of the counting rack and abacus areas. By making the two parts of each cover section of different sizes, as shown in the drawing, areas of different sizes can be exposed to accommodate a larger or smaller number of counters on each rod for the different types of abaci. If desired, the cover or covers can take the form of a sliding panel positioned in suitable guides or grooved members at the sides of the counting rack and abacus frames. Where a more compact structure is desired, the apparatus can be made of two separate parts, as by being split along the partition 13, the parts being hinged together and being capable of being folded upon each other. With such construction the use of cover sections can be dispensed with as far as their covering function is concerned, but it will still be desirable to utilize a removable panel in each of the sections for exposing at will different areas of the counting rack and abacus structures.

It will be recognized from the foregoing that while one of the uses of my combined counting frame and abacus is for the purpose of instruction of children in lower grades, it may likewise be employed by teachers of the history of mathematics and also by teachers in teachers' training colleges for illustrating methods of teaching arithmetic and also for showing the development of the concept of number in various arithmetical operations. The apparatus can also be marketed in the form of an educational toy for use by a child at home, especially by one who may be backward at school, the apparatus being used with the aid of a manual and with the cooperation of the parent.

While in the foregoing I have referred to the use of different colors to differentiate different beads or groups of counters, both on the same rod or place and on the different rods or places, it will be understood that any other mode of differentiating the different counters can be employed as by giving them different shapes, or sizes, or by a combination of a number of different physical attributes.

It will be also evident that in place of beads or counters sliding on a rod, other devices for representing numbers, such as marbles moving in grooves, cylindrical elements sliding on a rod or likewise moving in a groove, buttons of various shapes, such as the I-beam shape or collar-button shape of the ancient Roman beads, may be employed, and it will be understood that where I employ the term "counters" and "rods" in the claims, such terms are to be understood as embracing these equivalent devices.

While I prefer to arrange the counting rack rods and abacus rods at right angles to each other as shown in the drawing, it will be recognized that many of the advantages of my invention can be secured by arranging all of the rods of the two frames parallel to each other, and running either horizontally or vertically. The arrangement of the abacus rods in the vertical direction is, however, preferred because of the resemblance of such structure with the method of arranging the digits of a number.

It will be apparent that while my improved apparatus as while is particularly adapted for the instruction of children in the arithmetical operations, and while the abacus section alone or in conjunction with the counting rack section is highly adapted for use as an aid in the teaching of the history of mathematics and particularly of the development of the abacus, the apparatus is suitable also for use as an educational toy while at least the abacus section can be employed for performing arithmetical computations in various retail stores and the like. It will be evident also that where the abacus section is to be employed only for the recording or representation of numbers, it need have only nine or, if desired, ten beads or counters on each rod. The same is true where the abacus is employed in the elementary grades wherein the adding of numbers is restricted to those whose corresponding digits do not total more than nine, so that no carrying over from one place to the next is involved. Where, however, the child has reached the stage where the addition of numbers is to be accomplished whose corresponding digits total more than nine, or where subtraction is to be taught with numbers wherein the subtrahend has digits of higher value than the minuend, then the use of nineteen digits in each abacus column is preferred as with the aid of the upper ten beads or counters the notion of "carrying over" and of "borrowing" can be more readily illustrated and comprehended.

I claim:

1. A combined counting rack and abacus comprising a frame, means dividing the same into two sections, a series of parallel rods within each of said sections, the rods in one of said sections being perpendicular to those in the other section so as to extend in the horizontal direction when the frame is in a substantially vertical plane and to constitute the counting rack section of said apparatus, and counters arranged on said rods, the counters on the counting frame being visibly similar to and thus recognizable as having the same value as the counters in the units column of the abacus and being visibly dissimilar from the counters in the other columns of the abacus.

2. An educational apparatus comprising a frame, means dividing the same into two sections, a series of parallel rods within each of said sections, the rods in one of said sections being perpendicular to those in the other section and extending in the horizontal direction when the frame is in a substantially vertical plane, and forming a counting rack, and counters arranged on said rods, there being a plurality of juxtaposed counters on each rod of the counting rack section to enable numbers of single and multiple digits to be represented by shifting the counters on one or more of such counting rack rods, the first five counters on each rod of the counting rack being similarly colored, such color being different from the color of the next five counters on such rods, such latter five counters on all of the rods of the counting rack section being likewise similarly colored, the rods in the abacus section each having nineteen counters thereon, the counters on each rod being divided into groups of five, five, five and four counters, the groups of counters on the units rod of the abacus section being colored similarly to the counters in the counting rack, while the counters on the remaining rods of the abacus section are colored differently from each other and the groups of counters on each rod being likewise colored differently from each other and from the counters on the units rod.

3. An educational apparatus comprising a frame, means dividing the same into two sections, a series of parallel rods within each of said sections, the rods in one of said sections being perpendicular to those in the other section and extending in the horizontal direction when the frame is in a substantially vertical plane, said section being a counting rack, and counters arranged on both series of rods, there being a plurality of juxtaposed counters on each rod of the counting rack section to enable numbers of single and multiple digits to be represented by shifting the counters on one or more rods of such section, the other section of the apparatus forming an abacus, the counters on the rods of the abacus being shiftable to represent on the abacus numbers of multiple digits in the Hindu-Arabic system of notation corresponding to a representation of such numbers in gross in the counting rack section by the requisite number of counters all having unit value, the counters of the abacus section being differently colored on the different rods, the color of the counters in the units column of the abacus being the same as the color of the counters in the counting rack section to indicate the identical unit values for such counters.

NATHAN LAZAR.

References Cited in the file of this patent
UNITED STATES PATENTS

| Number | Name | Date |
|---|---|---|
| 232,482 | Fitch | Sept. 21, 1880 |
| 352,218 | Bolton et al. | Nov. 9, 1886 |
| 487,695 | Collins | Dec. 6, 1892 |
| 532,282 | Myers | Jan. 6, 1895 |
| 541,787 | Hegenwald et al. | June 25, 1895 |
| 861,541 | Rieck | July 30, 1907 |
| 1,233,544 | Bissey | July 17, 1917 |
| 2,228,554 | Brown | Jan. 14, 1941 |
| 2,457,332 | Wade et al. | Dec. 28, 1948 |

FOREIGN PATENTS

| Number | Country | Date |
|---|---|---|
| 3,036 | Great Britain | Mar. 7, 1885 |
| 21,915 | Great Britain | Sept. 29, 1913 |
| 238,782 | Germany | Oct. 3, 1911 |
| 337,699 | Germany | June 6, 1921 |